(12) United States Patent
Dunjic et al.

(10) Patent No.: US 12,229,411 B2
(45) Date of Patent: Feb. 18, 2025

(54) SYSTEMS AND METHODS FOR MANAGING ACCESS TO RESOURCES IN A COMPUTING ENVIRONMENT

(71) Applicant: The Toronto-Dominion Bank, Toronto (CA)

(72) Inventors: Milos Dunjic, Oakville (CA); David Samuel Tax, Toronto (CA); Kushank Rastogi, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 156 days.

(21) Appl. No.: 17/950,471

(22) Filed: Sep. 22, 2022

(65) Prior Publication Data

US 2024/0103736 A1 Mar. 28, 2024

(51) Int. Cl.
*G06Q 10/00* (2023.01)
*G06F 3/06* (2006.01)
*G06Q 10/0631* (2023.01)

(52) U.S. Cl.
CPC .......... *G06F 3/0616* (2013.01); *G06F 3/0653* (2013.01); *G06F 3/0673* (2013.01); *G06Q 10/0631* (2013.01)

(58) Field of Classification Search
None
See application file for complete search history.

(56) References Cited

U.S. PATENT DOCUMENTS

| | | | |
|---|---|---|---|
| 7,636,689 B2 | 12/2009 | Dent et al. | |
| 11,042,849 B2 | 6/2021 | Swami et al. | |
| 11,068,709 B1 | 7/2021 | Sachtleben et al. | |
| 11,144,989 B1 | 10/2021 | Bardouille et al. | |
| 2002/0069168 A1 | 6/2002 | Lee et al. | |
| 2008/0033774 A1* | 2/2008 | Kimbrel | H04L 67/1008 705/7.25 |
| 2009/0164533 A1* | 6/2009 | Hubbard | H04L 9/3239 711/170 |
| 2009/0271239 A1* | 10/2009 | Underdal | G06Q 10/20 705/305 |
| 2010/0217642 A1* | 8/2010 | Crubtree | H04L 67/025 726/4 |
| 2011/0040598 A1* | 2/2011 | Brady | G06Q 10/06313 705/7.13 |

(Continued)

OTHER PUBLICATIONS

Liu, Boyun, Workload forecasting based elastic resource management in edge cloud, 2020, Computers & Industrial Engineering, https://www.sciencedirect.com/science/article/pii/S0360835219306059, p. 1-12. (Year: 2020).*

*Primary Examiner* — Joseph M Waesco
(74) *Attorney, Agent, or Firm* — Rowand LLP; Peter Eschlboeck

(57) ABSTRACT

Methods and computer systems for managing access to resources in a computing environment. Detecting a projected overload condition from a projected demand for a resource. Identifying a server associated with a resource demand scheduled to be fulfilled prior to the projected overload condition. Generating a rescheduling request to reschedule the resource demand until after the projected overload condition. Sending the rescheduling request to the identified server. Providing access to the resource at a rescheduled time.

20 Claims, 8 Drawing Sheets

(56) References Cited

U.S. PATENT DOCUMENTS

| | | | |
|---|---|---|---|
| 2012/0173477 A1* | 7/2012 | Coutts | G06F 16/217 |
| | | | 707/602 |
| 2013/0060397 A1* | 3/2013 | Hawkins | G06Q 50/06 |
| | | | 700/296 |
| 2014/0012746 A1 | 1/2014 | Hanson et al. | |
| 2014/0079207 A1* | 3/2014 | Zhakov | H04M 3/5233 |
| | | | 379/265.03 |
| 2014/0196051 A1* | 7/2014 | Subramanya | G06Q 10/0631 |
| | | | 718/104 |
| 2016/0072287 A1* | 3/2016 | Jia | H02J 3/0073 |
| | | | 700/295 |
| 2016/0316388 A1* | 10/2016 | Rosen | H04W 28/0231 |
| 2017/0193477 A1 | 7/2017 | Holt et al. | |
| 2019/0021037 A1* | 1/2019 | Shaw | H04W 36/08 |
| 2020/0380481 A1 | 12/2020 | Kalaboukis | |
| 2021/0075253 A1* | 3/2021 | Fujiura | G06Q 50/06 |
| 2022/0108292 A1 | 4/2022 | Terrell et al. | |
| 2023/0316169 A1* | 10/2023 | Albero | G06N 10/60 |
| | | | 705/7.12 |

* cited by examiner

SYSTEMS AND METHODS FOR MANAGING ACCESS TO RESOURCES IN A COMPUTING ENVIRONMENT

FIELD

The present disclosure relates to computer-resource management and, more particularly, to systems and methods for managing access to resources in a computing environment.

BACKGROUND

Computing systems may encounter demand for resources that may place tremendous strain on those resources. Sometimes the demand exceeds the amount of resources available and causes a failure within the computing environment.

It would be advantageous to provide for enhanced management of access to resources.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DETAILED DESCRIPTION OF EXAMPLE EMBODIMENTS

Figure 1:
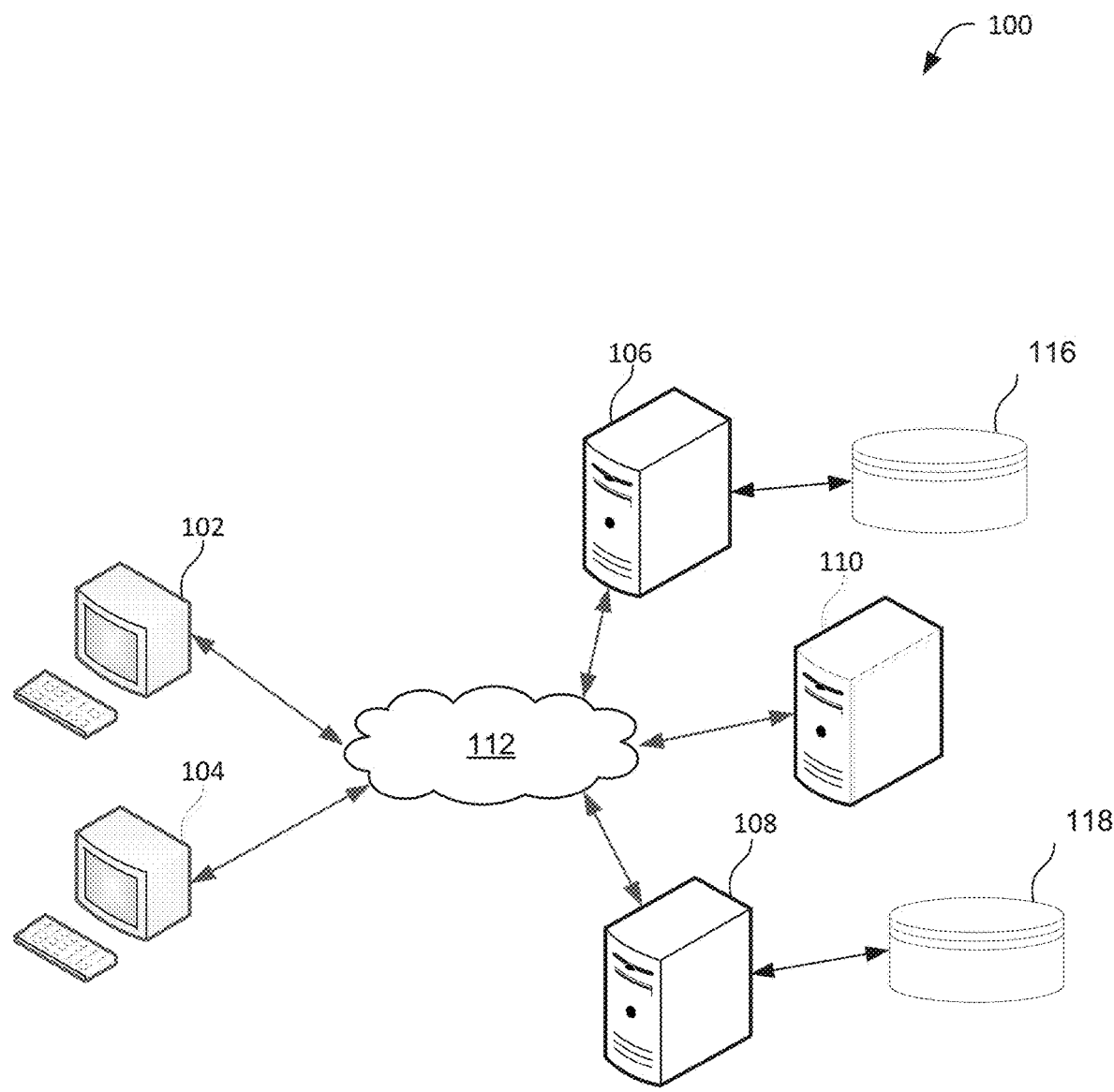
FIG. 1 shows a schematic diagram illustrating an operating environment of an example embodiment according to the subject matter of the present application.

In one embodiment, the present application describes a computer system. The computer system may include a communications module; a processor coupled to the communications module; and a memory coupled to the processor. The memory may store instructions that, when executed by the computer system, cause the computer system to: detect a projected overload condition from a projected demand for a resource; identify a server associated with a resource demand scheduled to be fulfilled prior to the projected overload condition; generate a rescheduling request to reschedule the resource demand until after the projected overload condition; send the rescheduling request to the identified server; and provide access to the resource at a rescheduled time.

In some implementations, detecting the projected overload condition may include detecting a projected shortfall event.

In some implementations, the resource demand scheduled to be fulfilled prior to the projected overload condition may include a transfer that is scheduled to occur prior to a projected shortfall event.

In some implementations, the rescheduling request may include a transfer extension request to reschedule a transfer until after a projected shortfall event.

In some implementations, the projected demand for the resource may be based on a history of transfers.

In some implementations, identifying the server may be based on identifying a transfer that is sufficient to cover a projected shortfall event.

In some implementations, identifying the server may be based on identifying a resource demand that includes an overage.

In some implementations, identifying the server may be based on identifying a resource demand that is associated with a server that supports rescheduling of resource demands.

In some implementations, identifying the server may include selecting a resource demand corresponding to an amount that is close to an amount of a projected shortfall event.

In some implementations, identifying the server may include mapping an identifier associated with the scheduled resource demand to the server.

In another aspect, present application describes a method for controlling access to software features in a computing environment. The method may include detecting a projected overload condition from a projected demand for a resource; identifying a server associated with a resource demand scheduled to be fulfilled prior to the projected overload condition; generating a rescheduling request to reschedule the resource demand until after the projected overload condition; sending the rescheduling request to the identified server; and providing access to the resource at a rescheduled time.

In yet another aspect, present application describes a non-transitory computer-readable storage medium comprising processor-executable instructions which, when executed, configure a processor to: detect a projected overload condition from a projected demand for a resource; identify a server associated with a resource demand scheduled to be fulfilled prior to the projected overload condition; generate a rescheduling request to reschedule the resource demand until after the projected overload condition; send the rescheduling request to the identified server; and provide access to the resource at a rescheduled time.

In yet a further aspect, the present application describes a non-transitory computer-readable storage medium storing processor-readable instructions that, when executed, configure a processor to perform any of the methods described herein. Also described in the present application is a computing device comprising: a processor, memory, and an application containing processor-executable instructions that, when executed, cause the processor to carry out at least one of the methods described herein. In this respect, the term processor is intended to include all types of processing circuits or chips capable of executing program instructions.

Other aspects and features of the present application will be understood by those of ordinary skill in the art from a review of the following description of examples in conjunction with the accompanying figures.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . ." is intended to cover any one or more of the listed elements, including any one of the listed elements alone, any subcombination, or all of the elements, without necessarily excluding any additional elements, and without necessarily requiring all of the elements.

In the present application, the terms "a processor" or "the processor" may include multiple processors which may act in cooperation.

The term "real-time", "near real-time", or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data may be less than 1 ms, less than 1 sec., or less than 5 secs.

The present application makes reference to a "transfer message", which is a computer-readable message configured for transmission over one or more computer networks between a sending device and a receiving device. The transfer message may be a structured message having a defined schema or set of predefined fields to contain data. The transfer message may be used to transfer resources from one entity to another entity. In particular, the transfer message may be used to effect a change in recorded ownership of resources. The resources may be currency, physical assets, credits, tokenized items like non-fungible tokens, computing resources such as memory allocated or processor time, access rights, or any other resource that may be owned or credited to an account associated with an account holder. In many of the examples below, monetary resources may be referenced to illustrate concepts, but the present application is not necessarily solely applicable to financial or monetary instruments or resources.

The transfer message may be or include a request to transfer. A request to transfer may be a specially formatted message that is sent from a first database management system to a second database management system. The request to transfer may be sent from the first database management system to the second database management system over a transfer rail that is used for facilitating transfers between databases associated with different database management systems. For example, the first database management system may be associated with a first database and the second database management system may be associated with a second database. The databases may store account data. That is, the databases may store data that is associated with various accounts. In at least some implementations, each record in the database may be associated with a particular one of these accounts.

A request to transfer is a message that is sent on behalf of a recipient to initiate a transfer from a sender to the recipient. That is, the request to transfer is sent, on behalf of the recipient, from the database management system associated with the recipient to the database management system associated with the sender. The request to transfer requests a transfer from a record in the database that is associated with the sender to a record in the database that is associated with the recipient. The request to transfer includes one or more identifiers that identify the record associated with the sender and/or the record associated with the recipient. The identifier(s) may be or include an account number. The request to transfer may also include one or more identifiers that identify the database management system associated with the sender and/or that identify the database management system associated with the recipient. Such identifiers may be or include one or more of: a transit number and an institution number.

The request to transfer is a transfer initiation message. That is, the request to transfer is an initial message that may be used to cause a transfer to occur. Since the request to transfer is initiated by a recipient rather than a sender, the request to transfer may be considered to a pull-style transfer, which may be contrasted with typical push-style transfers. In at least some implementations, the request to transfer may be formatted as an ISO20022 message.

The request to transfer message is specially formatted to include parameters of a transfer that is requested to be made from a sender. The parameters may be included as metadata in the transfer message. Where the request to transfer is an ISO20022 message, the parameters may be included in an ISO20022 format. The parameters may include resource definition data. The resource definition data defines what is requested to be transferred. By way of example, the resource definition data may define a resource that is stored in or otherwise associated with a record associated with the sender. The resource may be, for example, a computing resource. In another implementation, the resource may be data. In some implementations, the resource may represent an amount of value, such as a quantity of a currency.

The parameters that are included in the request to transfer may include data of another type. For example, in some implementations, the parameters may be or include transfer scheduling data. The transfer scheduling data may represent a time when the requested transfer is to be made. This time may be, for example, a due date or deadline. The due date or deadline represents a latest time at which the transfer is to be made.

The request to transfer message may, in some implementations, be or represent a request for payment. Such a message may be referred to as a request for payment (RFP) message or a request to pay (RTP) message. In such implementations, the transfer rail may be a payment rail such as a real time payment rail and the database management systems may be a financial institution systems. In at least some such implementations, the records may represent bank accounts and a transfer may be a request to transfer value from a sender bank account to the recipient bank account. The request to transfer message may be sent from a first financial institution system, which is associated with a first financial institution, to a second financial institution system, which is associated with a second financial institution.

The request to transfer message is a special transfer message which is not formatted as an email or short message service (SMS) message. Rather, it is a computer-to-computer message that is formatted to be specially processed by the database management system that receives it. For example, the database management system that receives the request to transfer message may be configured to execute a process for obtaining authorization to complete a transfer in response to receiving the request to transfer. More particularly, the database management systems may be configured to only permit authorized transfers. For example, in one implementation, the database stores account data for a plurality of accounts and a database management system will only allow a transfer out of an account if the transfer is authorized by an authorization entity for that account, such as an account holder. Authorization may, for example, require authenticated approval using a credential such as one or more of a username, password, biometric authentication data or other credential.

In one implementation, in response to receiving the transfer message, a database management system may identify an affected account using an identifier defined by the transfer message. Then, the database management system may send an electronic notification to a client device associated with the identified account. This notification may be provided as an in-application notification or operating system level notification. The notification may include a selectable option to authorize the transfer.

The notification may allow the transfer to be made without requiring input of one or more parameters that are typically required when a transfer is initiated by the sender rather than the recipient. By way of example, one or more parameters that are included in the request to transfer may be used to pre-stage or pre-populate parameters of the transfer so that the sender does not have to input such parameters. In some implementations, the resource definition data included in the request to transfer may be used to allow the transfer to be made without having the sender define what is to be transferred. For example, where the transfer is a transfer of a computing resource or data, the sender may perform the transfer without having to input any information defining the computing resource or data involved. Or, where the transfer is a transfer of an amount of value, the amount of value defined in the request for transfer message may be used so that the sender does not have to define the amount of value.

In some implementations, transfer scheduling data included in the request to transfer message may be used to schedule the transfer without requiring the sender to define such a schedule. For example, where the transfer scheduling data is a due date or deadline, the database management system associated with the sender may automatically define a time for a transfer based on the transfer scheduling data without requiring the sender to input such a time.

In this way, the sender may cause a database management system that is associated with the sender's record in a database to perform the transfer without having to input any parameters for the transfer.

In the present application, the terms "transferor" and "transferee" may be used interchangeably with "sender" and "recipient", respectively, in the context of describing transfers of resources. In some cases, the terms "payor" or "payee" may be used in the example of monetary resources.

Many of the embodiments described herein focus on a transfer message that is provided as either a payment or request for payment. However, it is understood that the present application is not limited to any such embodiments and that the embodiments described with respect to a particular type of transfer generally may be extended to other types of transfers.

Example embodiments of the present application are not limited to any particular operating system, system architecture, mobile device architecture, server architecture, or computer programming language.

FIG. 1 shows a schematic diagram illustrating an operating environment of an example embodiment. The operating environment in this example includes a first system 106, a second system 108, a first remote device 102 and a second remote device 104. In some embodiments, the operating environment may include one or more remote devices or a plurality of remote devices, which may include the first remote device 102 and/or the second remote device 104.

As illustrated, the first system 106 may provide a front-end interface which allows the remote devices 102 and 104 to interact with the first system 106. For example, the first system 106 may provide one or more graphical user interfaces (GUIs) to the remote devices 102 and 104. By way of example, the first system 106 may provide, to the remote devices 102 and 104, a user interface. The user interface provided to the remote devices 102 and 104 may be an interface for receiving user input indicating a resource demand. A resource demand may indicate a transfer of a resource between the account associated with the first computing system and the account associated with the second computing system and/or a request for a transfer of a resource.

The first system 106 may be managed, operated, or controlled by an entity that may be an agent of a first account holder and may be a financial institution, such as a bank. The first account holder may be a customer (e.g. a corporate/business customer) or client of the entity or otherwise associated with the entity.

The first system 106 may include or be associated with a resource demand processing system (not shown) configured to facilitate the uploading of a resource demand (e.g. a request for transfer of resources or a request for payment) by the first account holder.

The first system 106 may include or be associated with a resource demand conditions processing system (not shown) configured to facilitate the uploading of resource demand conditions by the first account holder.

The first system 106 may store data regarding a mapping of an identifier associated with a resource demand (e.g. a financial institution identifier) to an identifier of the second computing system 108 (e.g. an Internet Protocol (IP) address or domain name). The mapping may be stored in data store 116.

The first system 106 may be configured to automatically identify shortfalls in an account and to request extensions of time for requests for payments that meet certain criteria. For example, the system may monitor projected inflows and outflows to an account and may identify when a shortfall is projected to occur. A shortfall may occur when a balance of the account is expected to fall below zero. The system may identify a shortfall by assuming that all requests for payments are to be paid on time and by assuming that a payroll will be credited to the account at a regularly scheduled pay cycle.

The first system 106 may be used to transmit a message to a system associated with a resource demand, for example, the second system 108 or the third system 110.

As illustrated, the first system 106 is in communication with the second system 108 and third system 110 via the network 112. The first system 106 may be configured to transmit to the second system 108 a message, for example, a transfer message. The second system 108 may be further configured to receive a transfer message from the first system 106. The first system 106 may also be configured to transmit to the third system 110 a message, for example, a rescheduling request. The third system 110 may be further configured to receive a rescheduling request from the first system 106.

The second system 108 may be managed, operated, or controlled by an entity that may be an agent of a second account holder and may be a financial institution, such as a bank. The second account holder may be a customer (e.g. a corporate/business customer) or client of the entity or otherwise associated with the entity.

The second system 108 may store data regarding one or more resource demands in a plurality of respective resource demand objects. The second system 108 may further store data regarding users or customers associated with the second system 108 in a plurality of respective user account objects representing respective user accounts.

The third system 110 may be managed, operated, or controlled by the second account holder. The second account holder may be a party that issues the resource demand (e.g. an invoicing party) and may be a recipient of a transfer of a resource (e.g. a payment).

The first system 106, second system 108, third system 110 and remote devices 102 and 104 may be configured to ingest data from each other and may transmit requests, replies, alerts, notifications, configuration objects, or other data to each other.

The first system 106 and the second system 108 may store data in respective data stores 116 and 118. The data stores 116 and 118 are illustrated as single units for ease of illustration, but may include a plurality of storage units and, in some cases, storage media connected via the network 112.

As illustrated, each of the remote devices 102 and 104 is in communication with a first system 106 via a network 112. In some embodiments, each of the remote devices 102 and 104 may be managed, operated or controlled by respective account holders.

Each of the remote devices 102 and 104 may be used, for example, to receive user input that includes an indication of a resource demand. The user input may further include an indication of a transfer amount, a category, routing data, intended transferor, recipient, an account associated with the intended transferor, an account associated with the recipient, and other information to be included in or used to populate one or more fields in a resource demand.

Each of the remote devices 102 and 104 is a computing device. It may, as illustrated, be a desktop computer. However, the remote devices 102 and 104 may be a computing device of another type such as, for example, a smart phone, a laptop computer, a tablet computer, a notebook computer, a hand-held computer, a personal digital assistant, a portable navigation device, a mobile phone, a wearable computing device (e.g., a smart watch, a wearable activity monitor, wearable smart jewelry, and glasses and other optical devices that include optical head-mounted displays), an embedded computing device (e.g., in communication with a smart textile or electronic fabric), and any other type of computing device that may be configured to store data and software instructions, and execute software instructions to perform operations consistent with disclosed embodiments.

The first system 106, second system 108, and third system 110 are or include a computer system such as a computer server system or a database management system. A computer server system may, for example, be a mainframe computer, a minicomputer, or the like. In some implementations thereof, a computer server system may be formed of or may include one or more computing devices. A computer server system may include and/or may communicate with multiple computing devices such as, for example, database servers, web servers, email servers, file transfer protocol (FTP) servers, compute servers, and the like. Multiple computing devices such as these may be in communication using a computer network and may communicate to act in cooperation as a computer server system. For example, such computing devices may communicate using a local-area network (LAN). In some embodiments, a computer server system may include multiple computing devices organized in a tiered arrangement. For example, a computer server system may include middle tier and back-end computing devices. In some embodiments, a computer server system may be a cluster formed of a plurality of interoperating computing devices.

The first remote device 102, second remote device 104, first system 106, second system 108 and third system 110 may be in geographically disparate locations.

The network 112 is a computer network. The network 112 may be an internetwork such as may be formed of one or more interconnected computer networks. For example, such a network may be or may include an Ethernet network, an asynchronous transfer mode (ATM) network, a wireless network, or the like. In some implementations, the network 112 may be the Internet. The network 112 allows the first remote device 102, remote device 104, first system 106, second system 108 and third system 110 to communicate with one another.

As further described below, the first remote device 102, second remote device 104, first system 106, second system 108 and third system 110 may be configured with software to perform associated functions such as those described herein.

FIG. 1 illustrates the first system 106, second system 108, third system 110 and data stores 116 and 118 as separate computing devices. However, these systems may not be separate physical systems. For example, the first system 106 and the data store 116 may be implemented on a common physical device. As another example, the second system 108 and the data store 118 may be implemented on a common physical device. As yet another example, the second system 108 and the third system 110 may be implemented on a common physical device. As yet another example, the first system 106 and second system 108 may be implemented in software associated with a common processor. As yet a further example, the data stores 116 and 118 may be included in the first system 106 and second system 108, respectively, or may be external to those systems.

Figure 2:
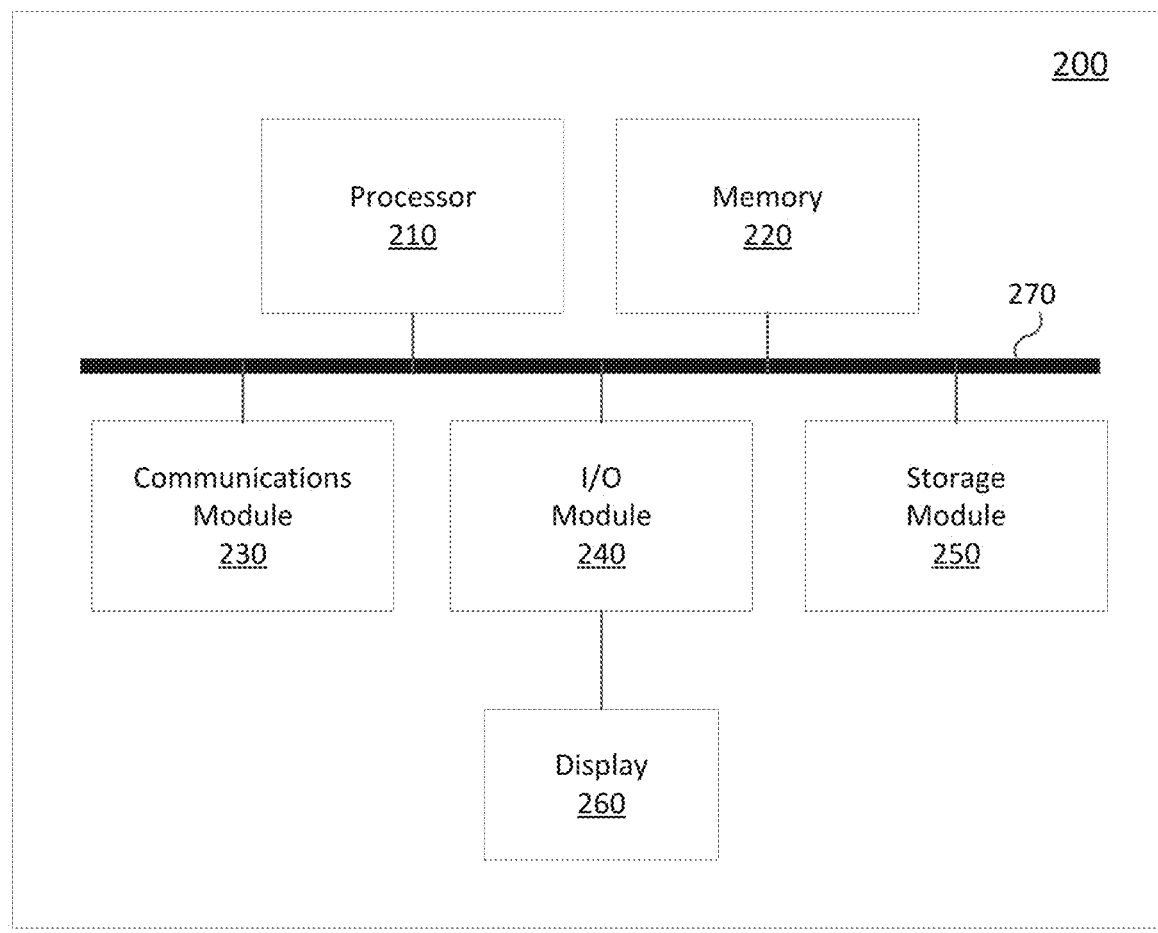
FIG. 2 shows a high-level schematic diagram of the remote device of FIG. 1.

An example embodiment of the remote device 102 or 104 will now be discussed with reference to FIG. 2. FIG. 2 is a high-level schematic diagram of the remote device 102 or 104. The remote device 102 or 104 may, in some embodiments, be a personal computer as shown in FIG. 1.

The remote device 102 or 104 includes a variety of modules. For example, as illustrated, the example computing device 200 may include a processor 210, a memory 220, a communications module 230, an I/O module 240, and/or a storage module 250. As illustrated, the foregoing example modules of the example computing device 200 are in communication over a bus 270. As such, the bus 270 may be considered to couple the various modules of the remote device 102 or 104 to each other, including, for example, to the processor 210.

The processor 210 is a hardware processor. The processor 210 may, for example, be one or more ARM, Intel x86, PowerPC processors or the like.

The memory 220 allows data to be stored and retrieved. The memory 220 may include, for example, random access memory, read-only memory, and persistent storage. Persistent storage may be, for example, flash memory, a solid-state drive or the like. Read-only memory and persistent storage are a non-transitory computer-readable storage medium. A computer-readable medium may be organized using a file system such as may be administered by an operating system governing overall operation of the remote device 102 or 104.

The communications module 230 allows the remote device 102 or 104 to communicate with other computing devices and/or various communications networks such as, for example, the network 112. For example, the communications module 230 may allow the remote device 102 or 104 to send or receive communications signals. Communications signals may be sent or received according to one or more protocols or according to one or more standards. The communications module 230 may allow the remote device 102 or 104 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE), 5G or the like. Additionally or alternatively, the communications module 230 may allow the remote device 102 or 104 to communicate using near-field communication (NFC), via Wi-Fi™, using Bluetooth™ or via some combination of one or more networks or protocols. In some embodiments, all or a portion of the communications module 230 may be integrated into a component of the remote device 102 or 104. For example, the communications module 230 may be integrated into a communications chipset.

The I/O module 240 is an input/output module. The I/O module 240 allows the remote device 102 or 104 to receive input from and/or to provide input to components of the remote device 102 or 104 such as, for example, various input modules and output modules. For example, the I/O module 240 may, as shown, allow the remote device 102 or 104 to receive input from and/or provide output to the display 260.

The storage module 250 allows data to be stored and retrieved. In some embodiments, the storage module 250 may be formed as a part of the memory 220 and/or may be used to access all or a portion of the memory 220. Additionally or alternatively, the storage module 250 may be used to store and retrieve data from persisted storage other than the persisted storage (if any) accessible via the memory 220. In some embodiments, the storage module 250 may be used to store and retrieve data in/from a database. A database may be stored in persisted storage. Additionally or alternatively, the storage module 250 may access data stored remotely such as, for example, as may be accessed using a local area network (LAN), wide area network (WAN), personal area network (PAN), and/or a storage area network (SAN). In some embodiments, the storage module 250 may access data stored remotely using the communications module 230. In some embodiments, the storage module 250 may be omitted and its function may be performed by the memory 220 and/or by the processor 210 in concert with the communications module 230 such as, for example, if data is stored remotely.

The remote device 102 or 104 may include or be connected to a display 260. The display 260 is a module of the remote device 102 or 104. The display 260 is for presenting graphics. The display 260 may be, for example, a liquid crystal display (LCD). In addition to being an output device, the display 260 may also be an input device. For example, the display 260 may allow touch input to be provided to the remote device 102 or 104. In other words, the display 260 may be a touch sensitive display module. In a particular example, the display 260 may be a capacitive touch screen.

Software comprising instructions is executed by the processor 210 from a computer-readable medium. For example, software may be loaded into random-access memory from persisted storage of the memory 220. Additionally or alternatively, instructions may be executed by the processor 210 directly from read-only memory of the memory 220.

Figure 3:
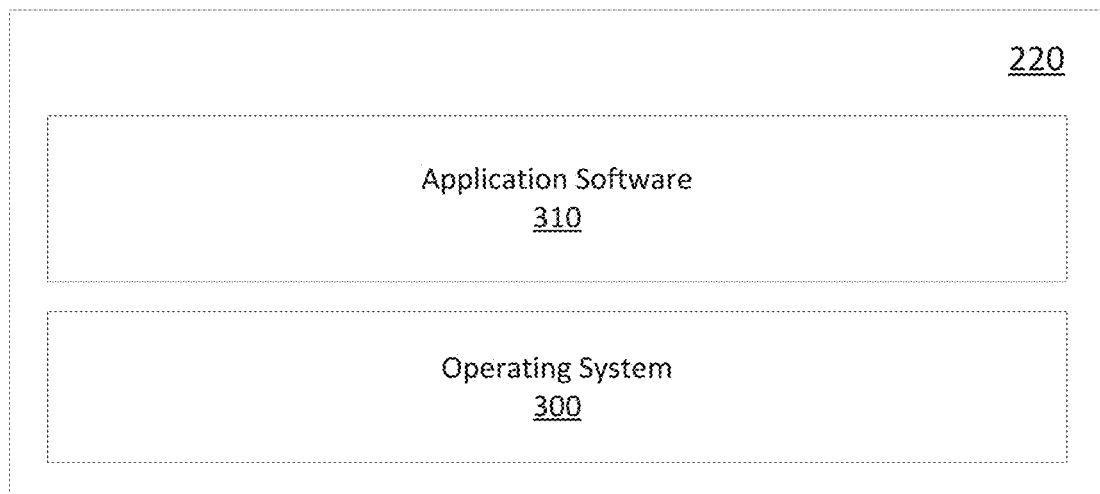
FIG. 3 shows a simplified organization of software components stored in a memory of the remote device of FIG. 2.

FIG. 3 depicts a simplified organization of software components stored in the memory 220 of the remote device 102 or 104. As illustrated, these software components include an operating system 300 and an application software 310.

The operating system 300 is software. The operating system 300 allows the application software 310 to access the processor 210 (FIG. 3), the memory 220, the communications module 230, the I/O module 240, and the storage module 250 of the remote device 100. The operating system 300 may be, for example, Google™ Android™, Apple™ iOS™, UNIX™, Linux™, Microsoft™ Windows™, Apple OSX™ or the like.

The application software 310 adapts the remote device 102 or 104, in combination with the operating system 300, to operate as a device for facilitating data transfers.

As noted above, the first system 106, second system 108 and third system 110 are or include a computer system. An example computer system 400 will now be discussed with reference to FIGS. 4 and 5. Suitably-configured instances of the example computer system 400 may, in some embodiments, serve as and/or be a part of the first system 106, second system 108 and/or third system 110.

Figure 4:
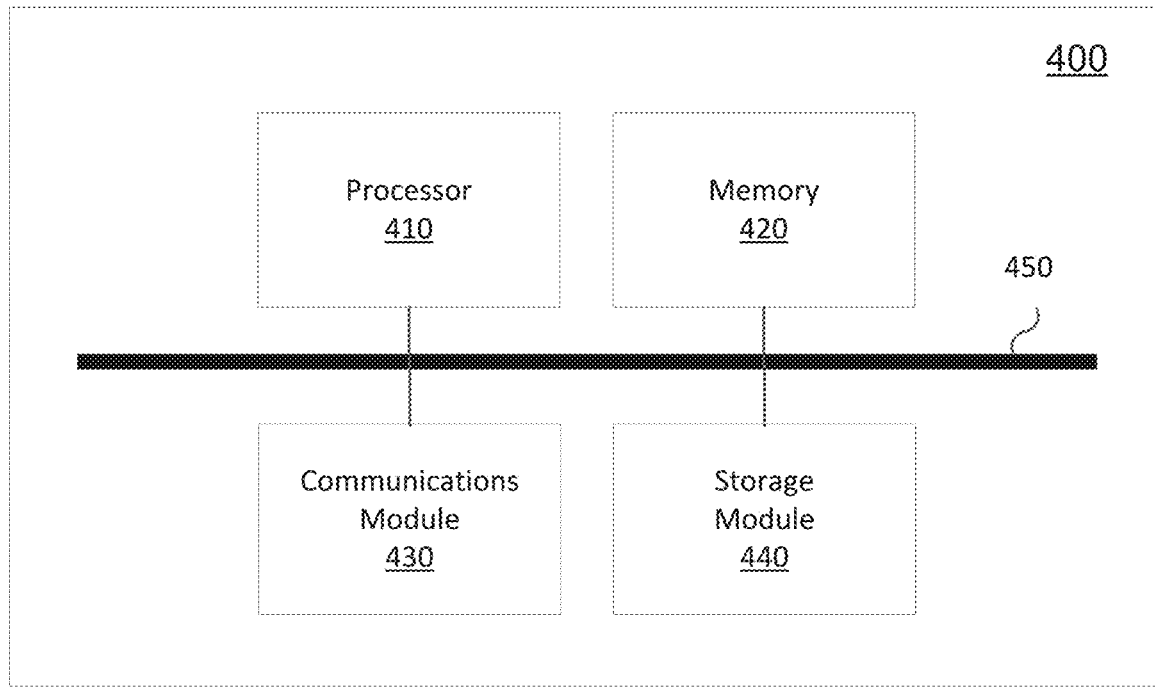
FIG. 4 shows a high-level schematic diagram of an example embodiment of the transferor, recipient, and rescheduling computing systems of FIG. 1.

FIG. 4 is a high-level schematic diagram of an example computer system 400.

The example computer system 400 includes a variety of modules. For example, as illustrated, the example computer system 400 may include a processor 410, a memory 420, a communications module 430, and/or a storage module 440. As illustrated, the foregoing example modules of the example computer system 400 are in communication over a bus 450. As such, the bus 450 may be considered to couple the various modules of the example computer system 400 to each other, including, for example, to the processor 410.

The processor 410 is a hardware processor. The processor 410 may, for example, be one or more ARM, Intel x86, PowerPC processors or the like.

The memory 420 allows data to be stored and retrieved. The memory 420 may include, for example, random access memory, read-only memory, and persistent storage. Persistent storage may be, for example, flash memory, a solid-state drive or the like. Read-only memory and persistent storage are a non-transitory computer-readable storage medium. A computer-readable medium may be organized using a file system such as may be administered by an operating system governing overall operation of the example computer system 400.

The communications module 430 allows the example computer system 400 to communicate with other computing devices and/or various communications networks such as, for example, the network 112. The communications module 430 may allow the example computer system 400 to send or receive communications signals. Communications signals may be sent or received according to one or more protocols or according to one or more standards. For example, the communications module 430 may allow the example computer system 400 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE), 5G or the like. Additionally or alternatively, the communications module 430 may allow the example computer system 400 to communicate via Wi-Fi™, using Bluetooth™ or via some combination of one or more networks or protocols. In some embodiments, all or a portion of the communications module 430 may be integrated into a component of the example computer system 400. For example, the communications module may be integrated into a communications chipset.

The storage module 440 allows the example computer system 400 to store and retrieve data. In some embodiments, the storage module 440 may be formed as a part of the memory 420 and/or may be used to access all or a portion of the memory 420. Additionally or alternatively, the storage module 440 may be used to store and retrieve data from persisted storage other than the persisted storage (if any) accessible via the memory 420. In some embodiments, the storage module 440 may be used to store and retrieve data in a database. A database may be stored in persisted storage. Additionally or alternatively, the storage module 440 may access data stored remotely such as, for example, as may be accessed using a local area network (LAN), wide area network (WAN), personal area network (PAN), and/or a storage area network (SAN). In some embodiments, the storage module 440 may access data stored remotely using the communications module 430. In some embodiments, the storage module 440 may be omitted and its function may be performed by the memory 420 and/or by the processor 410 in concert with the communications module 430 such as, for example, if data is stored remotely.

Software comprising instructions is executed by the processor 410 from a computer-readable medium. For example, software may be loaded into random-access memory from persistent storage of the memory 420. Additionally or alternatively, instructions may be executed by the processor 410 directly from read-only memory of the memory 420.

Figure 5:
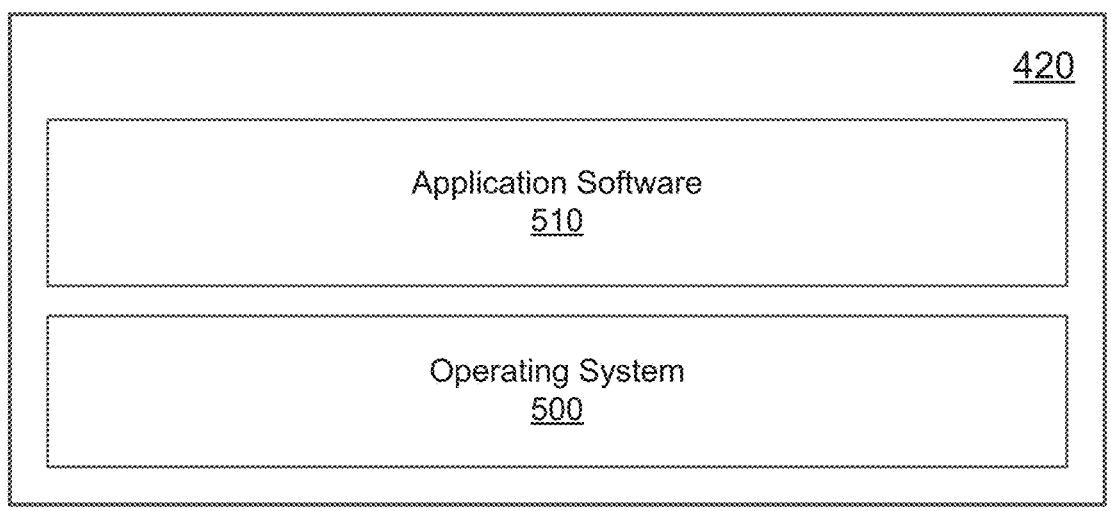
FIG. 5 shows a simplified organization of software components stored in the example computing systems of FIG. 4.

FIG. 5 depicts a simplified organization of software components stored in the memory 420 of the example computer system 400. As illustrated, these software components include an operating system 500 and an application software 510.

The operating system 500 is software. The operating system 500 allows the application software 510 to access the processor 410, the memory 420, the communications module 430, and the storage module 440 of the example computer system 400. The operating system 500 may be, for example, UNIX™, Linux™, Microsoft™ Windows™, Apple OSX™ or the like.

The application software 510, when executed, co-operates with the operating system 500 to adapt the example computer system 400 for some purpose and to provide some defined functionality. For example, the application software 510 may cooperate with the operating system 500 to adapt a suitable embodiment of the example computer system 400 to serve as the first system 106, second system 108 and/or third system 110.

Figure 6:
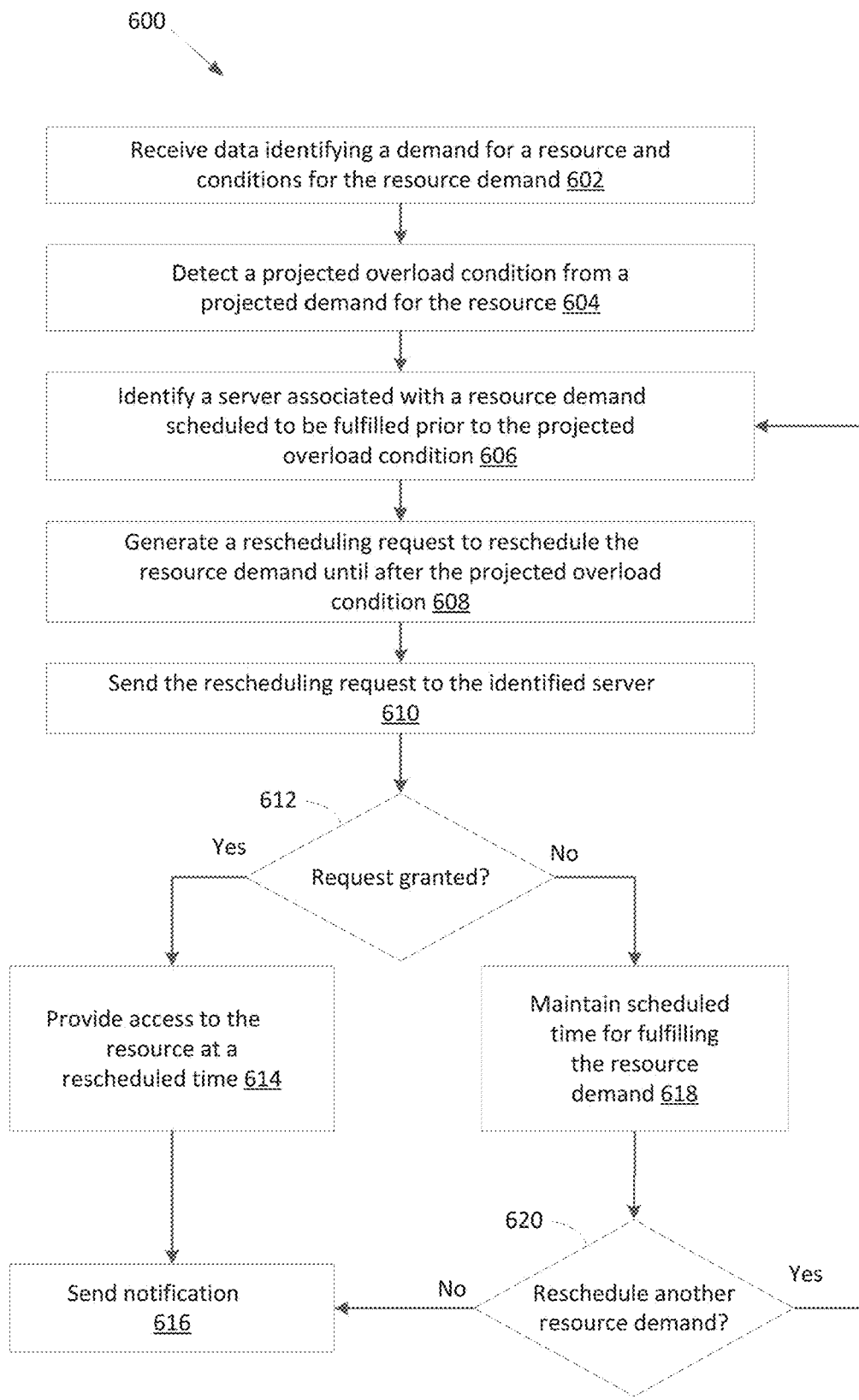
FIG. 6 is a flowchart showing operations performed in managing access to a resource based on a resource demand, according to an example embodiment.

Reference will now be made to FIG. 6 which illustrates an example method 600 for managing access to resources in a computing environment. The operations of the example method 600 may be performed by a computer system which may be of the type described herein. In some embodiments, the operations may be performed by a first computing system 106, which may be of the type described herein.

In operation 602, the first computing system may receive data identifying a demand for a resource and data identifying conditions corresponding to the resource demand.

Example parameters that may be included in the data identifying the resource demand include: a resource demand identifier identifying the particular resource demand; identification information of the type of resource demand (e.g. request for payment, request for transfer); scheduling data (e.g. payment due date or transfer deadline); identification information of the first and/or second account holders (e.g. full name, postal address, contact details, telephone number, email address, alias); an amount of resources to be transferred; and routing data. The routing data may include: identification information of the first and/or second system and/or the entity associated with, operating or managing the first and/or second system (e.g. a routing number, financial institution identifier, and/or branch transit number associated with the first and/or second system); and/or identification information of a first and/or second logical storage area, for example, a logical storage area identifier (e.g. bank account number), associated with, managed or controlled by a respective first and/or second account holder to or from which the amount of resources is to be transferred. A logical storage area may be or include an area of a data store. A logical storage area may further be or represent a bank account or other logical storage area for storing a quantity of a resource.

A resource demand may have an overage amount, a base amount and a full amount. The overage amount is an amount of a resource demand that exceeds the base amount. The overage may be an unexpected and/or variable portion of the full amount. The base amount of the resource demand may represent a typical, fixed recurring, fixed portion, or expected amount of the full amount of the resource demand. The full amount may be the sum of the base amount and the overage amount.

In some embodiments, the resource demand may indicate a request for payment and the overage may be, for example, overage charges for exceeding contractual limits such as data usage limits, long distance minutes, and/or talk time allocations. Requests for payments that do not have contractual limits may also have overages. In this case, the overages may represent the amount that a particular invoice exceeds a typical amount of the invoice. For instance, if utility invoices are typically $100 and a particular utility invoice is $120, the overage for that particular invoice is $20.

Example parameters that may be included in the data identifying the resource demand conditions include an indication of whether a time for fulfilling the resource demand is extendible (e.g. whether there is a contractual right of extension). Put another way, the parameter may indicate whether a server associated with the resource demand supports rescheduling of resource demands.

Example parameters that may further be included in the data identifying the resource demand conditions include a variance that is associated with, and may arise due to, deferring the time for fulfilling the resource demand. The variance may represent a fee, penalty or interest rate associated with rescheduling fulfillment of the resource demand and may be, for example, a fixed amount, a percentage of an amount of a resource demand, or some combination thereof. In some embodiments, the variance may be tiered based on an amount of the resource demand. Such costs or fees may represent a payment to compensate a recipient of a resource associated with the resource demand. The variance may arise due to a difference between an amount represented by the resource demand and an amount that is required to be fulfilled at a rescheduled time. Such difference may reflect, for example, a fee that should be paid at the rescheduled time when the resource demand is fulfilled.

The resource demand and corresponding conditions may be received in various ways. For example, the system may include or be associated with a resource demand processing platform that allows third parties to send resource demands to a user of the first computing system via the resource demand processing platform. The system may also include or be associated with a resource demand conditions processing platform that allows third parties to send resource demand conditions to a user of the first computing system via the resource demand conditions processing platform. In such instances, the system may receive the resource demand and/or conditions in a standardized format which allows for easy identification of necessary data such as a transfer amount and transfer date. In some embodiments the transfer may be an invoice, the transfer amount may be a payment amount, and the transfer date may be a due date of the payment.

Additionally or alternatively, the system may allow for the upload of a resource demand and/or resource demand conditions. The uploaded resource demand and/or conditions may, for example, be in a document format such as Portable Document Format (PDF) file or a media format such as Joint Photographic Experts Group (JPEG or JPG), that may be processed to identify parameters included in the resource demand and conditions.

For example, the data may be received from a remote device via an upload interface displayed on the remote device. The upload interface may be an interface, such as a web interface (e.g., a web page) displayed in a web browser on the remote device, and may be provided, by the resource demand processing system, resource demand conditions processing system or another computer system(s) performing the method 600, to the remote device for display. The upload interface may, for example, be provided by the first computing system in response to a request issued from the remote device to the first computing system over the network. For example, the upload interface may be provided in response to an HTTP GET received at the first computing system from the remote device. The user interface may include one or more interface elements configured for receiving input of one or more parameters. For example, the user interface may include one or more interface elements that prompt an operator or user to input data. For example, the user interface may allow an operator or user to select one or more resource demand files and/or resource demand conditions files to upload.

Figure 8:
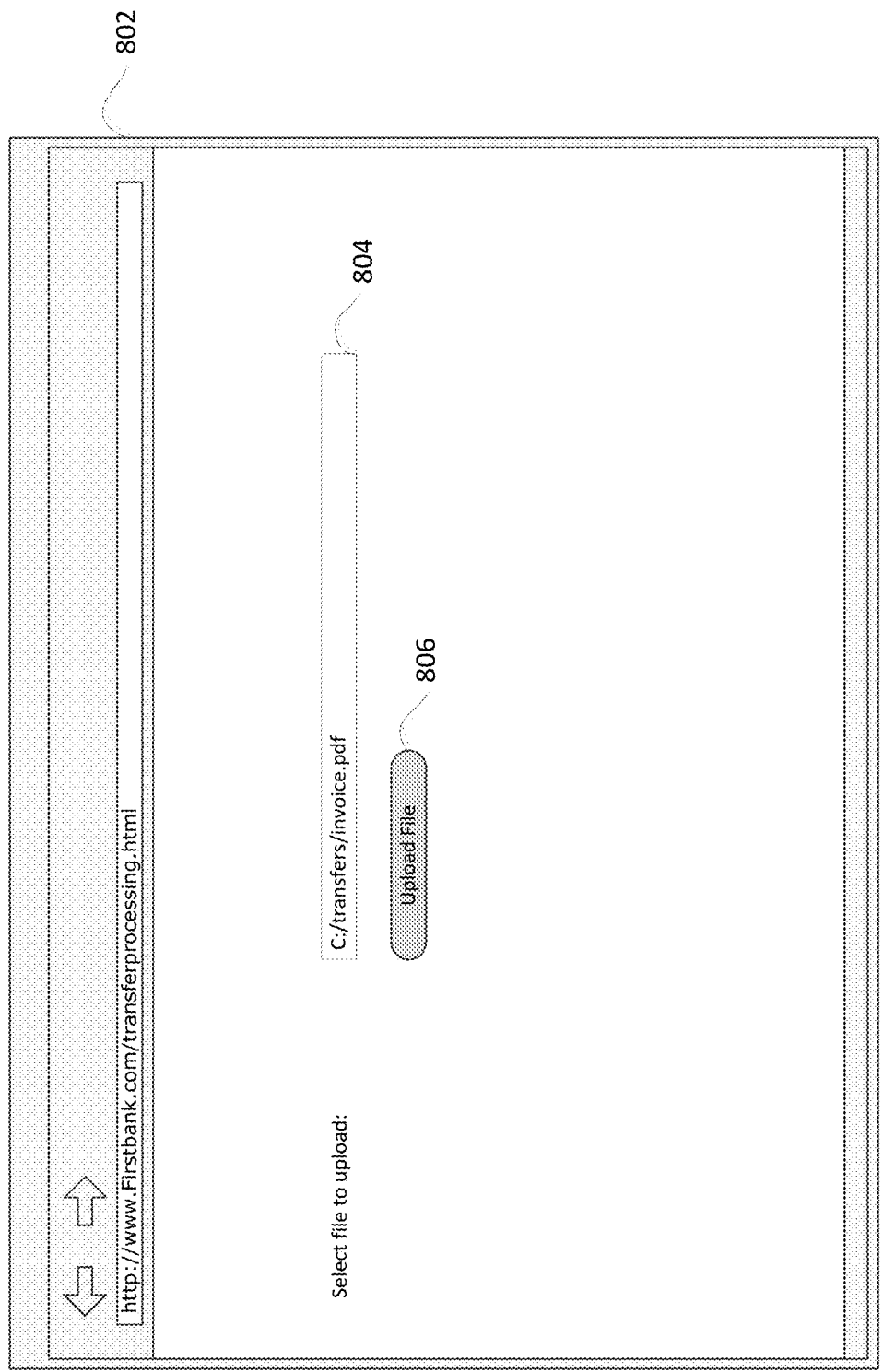
FIG. 8 is an example upload interface.

Referring briefly to FIG. 8, an example upload interface 802 is illustrated. The upload interface 802 may be displayed at the remote device in a web browser after an address associated with the upload interface 802 is input into the web browser; for example, using the address bar. The upload interface includes a selectable option for uploading a resource demand file. For example, a file locator selectable option 804 may be displayed and used for identifying a pointer to a local file. The pointer may include, for example, a path name and file name of the resource demand file. The upload interface 802 also includes a begin upload selectable option 806 which may be activated in order to trigger the sending of the resource demand file from the remote device to the resource demand processing system or another computer system(s) performing the method 600.

Although not shown in FIG. 8, the upload interface 802 may further include a selectable option for uploading a resource demand conditions file. The begin upload selectable option 806 which may be activated in order to additionally or alternatively trigger the sending of the resource demand conditions file from the remote device to the resource demand conditions processing system or another computer system(s) performing the method 600.

The upload interface 802 may, in at least some embodiments, be provided to the remote device after the remote device has successfully authenticated itself as being associated with a particular account in a database using a credential (e.g., username/password, biometric data, etc.). That is, the remote device uses a credential to confirm that it is associated with a particular account-holder, who may be referred to as an authenticated entity after successful authentication.

The resource demand file and resource demand conditions file that may be uploaded using the upload interface 802 are, therefore, associated with a particular account. The resource demand defined in the resource demand file may represent a future transfer of resources from that particular account to other accounts. The other accounts may include accounts in the same database (e.g., accounts at the same financial institution) and/or accounts in a different database (e.g., accounts at a different financial institution). In at least some implementations, the transfer may represent a payment.

A resource demand file and/or resource demand conditions file may be of the type described previously. For example, the resource demand file may define a single requested resource demand associated with a database. The database may be, for example, the data store 116 associated with the first computing system 106 or associated with the financial institution operating the first computing system 106. This data store 116 may maintain account balances for various bank accounts. The resource demand in the resource demand file may define information sufficient to initiate and complete a transfer. A resource demand file may be associated with a single transferor. For example, the resource demand file may include a transfer that transfers resources from an account associated with the authenticated entity. The system may extract such information, as well as other information, from the resource demand file and/or resource demand conditions file by applying optical character recognition (OCR) techniques to the and/or resource demand conditions file.

The receipt, by the first computing system, of the resource demand and/or resource demand conditions may trigger one or more operations. For example, the receipt of the resource demand may trigger the first computing system to schedule the resource demand to occur on a particular date and/or time specified by the scheduling data included in the resource demand.

Referring back to FIG. 6, the receipt by the first computing system of data identifying the resource demand and corresponding conditions may trigger one or more operations of the method 600 of FIG. 6. For example, in operation 604, in response to receiving the data identifying the demand for the resource, the first computing system may detect an overload condition from a projected demand for the resource.

In order to detect the overload condition, the system may compare a projection of the demand for the resource with a projection of the available amount of the resource. The projected demand may be based on an amount specified by a resource demand and, more particularly, the received resource demand. That is, the received resource demand may be used in determining the projected demand for the resource. The projected available resource may be based on a current amount.

An overload condition may be detected if the projected demand exceeds the projected amount of available resource at a particular time. The particular time may be the time at which the received resource demand has been scheduled to be fulfilled.

In some embodiments, detecting the projected overload condition may include detecting a projected shortfall event. A projected shortfall event may, for example, be detected when a resource associated with an account is projected to be insufficient to satisfy projected requests for transfers.

In operation 606, a first computing system identifies a server associated with a resource demand scheduled to be fulfilled prior to the expected overload condition. In some embodiments, the resource demand scheduled to be fulfilled prior to the projected overload condition includes a transfer that is scheduled to occur prior to a projected shortfall event.

Identifying the server may involve selecting a particular resource demand from a plurality of resource demands scheduled to be fulfilled prior to the expected overload condition. The selection of the resource demand may take into account various factors. For example, resource demands that are close to a shortfall amount may be preferred over others. In particular, the selected resource demand may correspond to an amount that is close to an amount of a projected shortfall event. If the resource demand includes a transaction, the selection may be based on identifying a transfer that is sufficient to cover the amount of a shortfall in a projected shortfall event and/or identifying a transfer that is close to the amount of the shortfall.

In some embodiments, the selection may be based on identifying a resource demand that includes an overage. The selection of resource demands that include overages may be preferred over those that do not.

In some embodiments, the selection may be based on identifying a resource demand that is associated with a server that supports rescheduling of resource demands. Some servers may routinely grant rescheduling requests while others do not. The first computing system may, in such circumstances, select resource demands associated with servers that routinely grant extension requests. Whether or not a particular server tends to grant extensions may be determined based on data from all or a plurality of accounts managed by the first computing system. For example, any instance where a rescheduling request was granted or denied may be used to determine which servers respond favourably to rescheduling requests and which do not.

In some embodiments, the selection may be based on the received resource demand conditions for rescheduling the resource demand. For example, the conditions may indicate whether rescheduling of a resource demand corresponding to the conditions is supported. If rescheduling is not supported for a resource demand, then that resource demand is not selected. Otherwise, the resource demand may be selected. By way of another example, the selection may be based on variances included in the resource demand conditions associated with the scheduled resource demands. In some embodiments, the resource demand having the lowest associated variance may be selected.

Once a resource demand has been selected, identifying the server may involve mapping the selected resource demand to a particular server. The first computing system may store a directory of identifiers that map to respective computing systems. The first computing system may obtain an identifier from the resource demand and use that identifier to lookup in the directory a server corresponding to the identifier. In some embodiments, the identifier may be a financial institution identifier at which the transferee is a customer and the server may be represented by an IP address or domain name. The IP address may also obtained by translating the domain name. The first computing system may use the IP address to connect to the server.

In operation 608, the first computing system generates a rescheduling request to reschedule the resource demand until after the expected overload condition. Put another way, the rescheduling request may be a request for an extension of time or a deferral. In embodiments involving transfers, the rescheduling request may include a transfer extension request to reschedule a transfer until after a projected shortfall event.

The rescheduling request may include one or more parameters. Example parameters include the parameters that are included in the resource demand. In particular, the rescheduling request may include: one or more identifiers that identify the resource demand; one or more identifiers that identify the resource; one or more identifiers that identify a resource or data record associated with the recipient. The identifier(s) may be or include an account number. The request to transfer may also include one or more identifiers that identify the database management system associated with the sender and/or that identify the database management system associated with the recipient. Such identifiers may be or include one or more of a transit number and an institution number.

The rescheduling request may further include a proposed amount to be rescheduled. The proposed amount may be a base amount, overage amount or a full amount of the resource demand. In some embodiments, the first computing system may request rescheduling of an amount that is less than the full amount, the base amount, or the overage amount. For example, the system may request rescheduling of only a shortfall amount. The shortfall amount may be the amount that is necessary to cover a projected shortfall.

In some cases, the first computing system may be configured to automatically generate a rescheduling request for only an overage amount if the resource is expected to have a shortfall. For example, the system may determine that the resource will have a shortfall if the full amount of a resource demand is fulfilled at the scheduled time, but no shortfall if the base amount of the resource demand is fulfilled at the scheduled time. In this case, the system may automatically generate a rescheduling request for the overage amount.

The rescheduling request may further include a proposed rescheduled time for fulfilling a deferred amount of the resource demand. The proposed rescheduled time should be after the projected overload condition. In some embodiments, the proposed rescheduled time may be based on a projected increase in the resource at the proposed rescheduled time. For example, the first computing system may monitor changes in the amount of a resource in order to identify increases that occur on a recurring basis and for a fixed amount. The proposed rescheduled time may be selected based on the identification of a pattern of events relating to increases in the resource. In some embodiments, the increases may be due to a payday for an account holder and the proposed rescheduled time may coincide with the payday. The rescheduling request may further include a guarantee that the resource demand will be fulfilled on the proposed rescheduled time. In some embodiments, the first computing system may provide such a guarantee since it may have insight into the timing and quantity of paydays.

In operation 610, the first computing system transmits, via an electronic message, the rescheduling request to the identified server.

Upon sending the request, the first computing system may provide a notification to the remote device that the rescheduling request has been sent. The notification may be provided in real time or near real time via the communications module. For example, the notification may be provided to the remote device immediately after the upload of the transfer file is completed. In this way, the notification may be provided as an upload status indicator. The notification may be displayed on a display of the remote device and the notification may appear to be displayed immediately after selection of the begin upload selectable option 806.

Providing the notification may include updating the upload interface displayed on the remote device to include the notification. That is, the web interface displayed on the remote device may be updated to include the notification.

Figure 9:
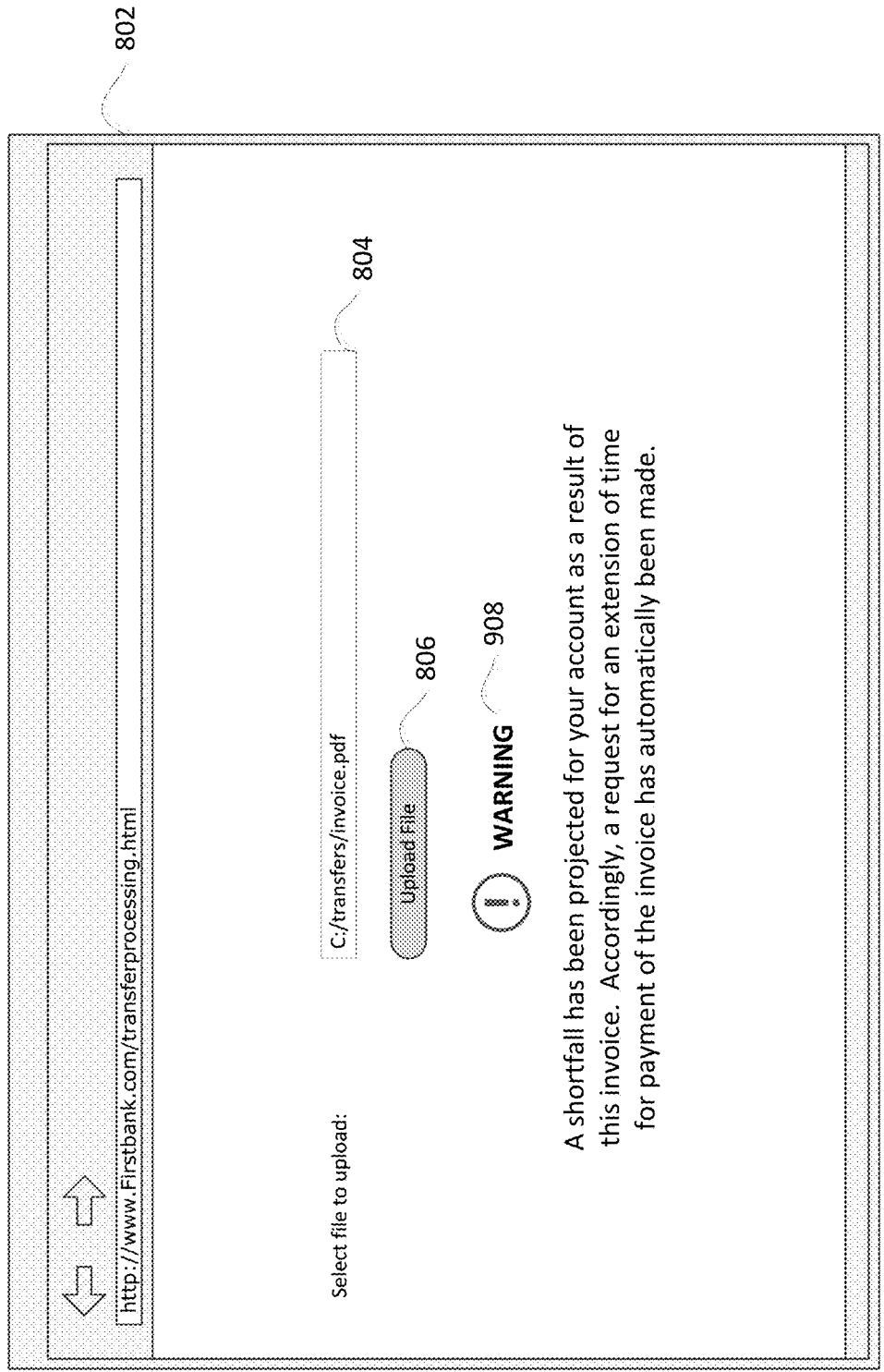
FIG. 9 is an example upload interface having a notification.

Referring briefly to FIG. 9, an example notification 908 is illustrated. The notification is, in the example, provided in a web interface and may be provided in the upload interface 802 of FIG. 8. The example notification 908 may be displayed at a location of a display that would, if no projected overload condition is detected, instead display an indication of completion of an upload. By way of example, if no projected shortfall is detected, the computer system(s) performing the method 600 may, instead, provide a notification that the upload was completed successfully and the notification of upload completion could be displayed in place of the notification that a rescheduling request was sent.

The notification may identify the particular resource demand for which the rescheduling request was sent. The notification may, in at least some implementations, also identify whether the rescheduling request is for a partial (e.g. an overage amount) or full amount of the resource demand.

In operation 612, the first computing system may receive a reply from the identified server. The reply may indicate whether the request is granted or denied. If the request is granted, then the first computing system may in operation 614 provide access to the resource at a rescheduled time. Otherwise, the first computing system may, in operation 618, provide access to the resource at the originally scheduled time and may, in operation 620, determine whether to send a subsequent rescheduling request regarding another resource demand that has been scheduled to be fulfilled prior to the projected overload condition. A subsequent rescheduling request may be sent if, in operation 606, a server can be identified for another resource demand scheduled to be fulfilled prior to the projected overload condition.

In operation 614, the first computing system provides access to the resource at the proposed rescheduled time. Providing access to the resource may involve the first computing system initiating the fulfillment of the resource demand at the proposed rescheduled time. In some embodiments, initiating the fulfillment of the resource demand includes transmitting, to a second computing system, a transfer message corresponding to the resource demand.

In operation 616, the computer system may transmit a notification to a remote device and present the notification to a user of the remote device via a user interface. The user interface may be that of a messaging application, such as an email application, text and/or voice message application, or instant message application. In some embodiments, the user interface may be a graphical user interface that presents the notification via pop-up, alert, or in any other suitable manner. The notification may be provided in real time or near real time via the communications module. For example, the notification may be provided to the remote device immediately after the upload of the transfer file is completed. In this way, the notification may be provided as an upload status indicator. The notification may be displayed on a display of the remote device and the notification may appear to be displayed immediately after selection of the begin upload selectable option 806.

Providing the notification may include updating the upload interface displayed on the remote device to include the notification. That is, the web interface displayed on the remote device may be updated to include the notification.

Figure 10:
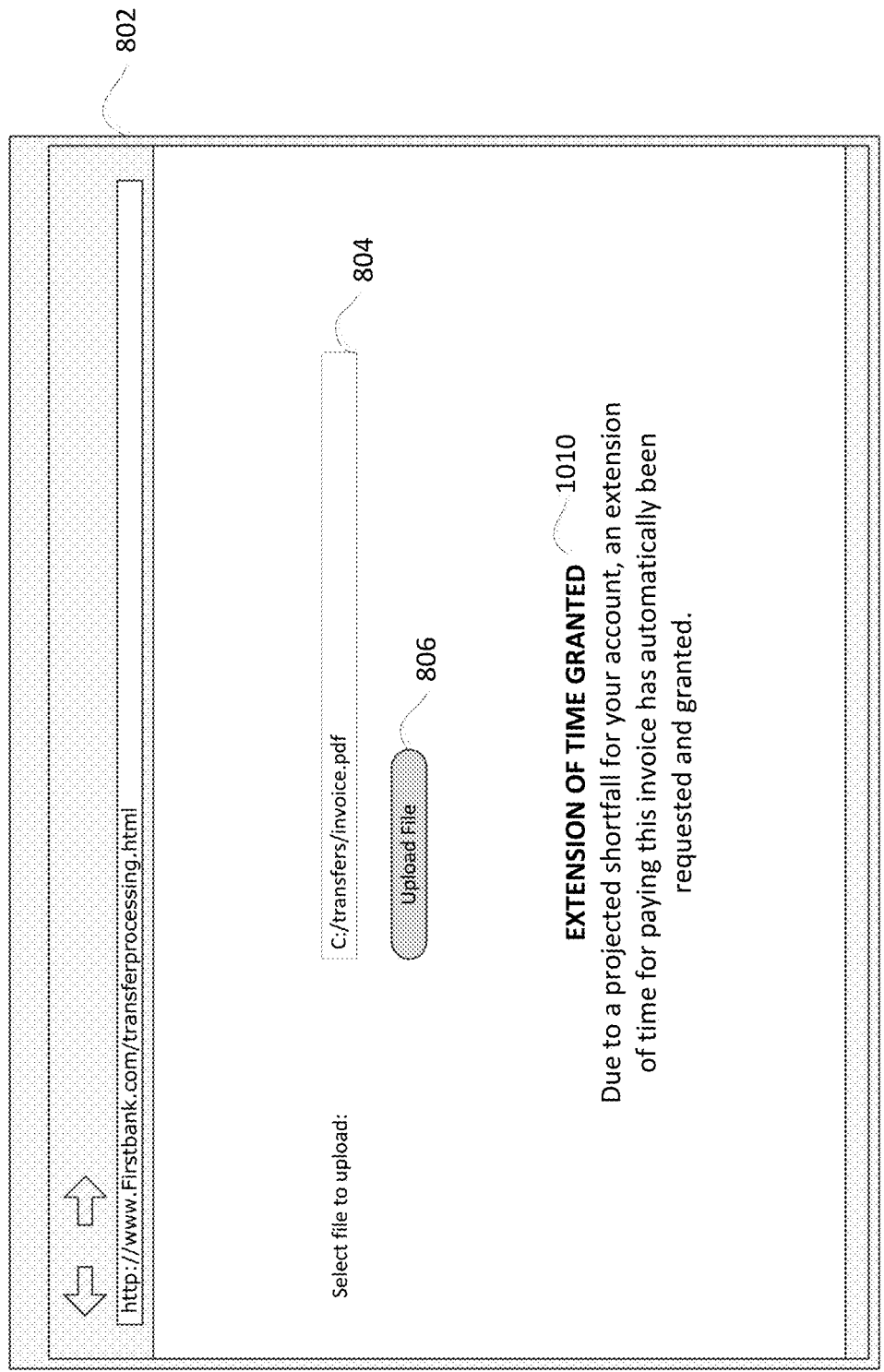
FIG. 10 is a further example upload interface having a notification.

Referring briefly to FIG. 10, an example notification 908 is illustrated. The notification is, in the example, provided in a web interface and may be provided in the upload interface 802 of FIG. 8. The content of the notification may depend on whether a projected overload condition exists. The example notification 1010 indicates that a projected overload condition was detected, but was addressed by rescheduling the uploaded resource demand. The notification may indicate, in at least some implementations, particulars of the rescheduling request and reply, such as, for example, the identity of the particular resource demand that was rescheduled, the rescheduled time, and the deferred amount. By way of another example, if none of the scheduled resource demands are rescheduled, the example notification may instead indicate that a projected overload condition exists and that the system was unable to successfully reschedule a resource demand to a later time.

Figure 7:
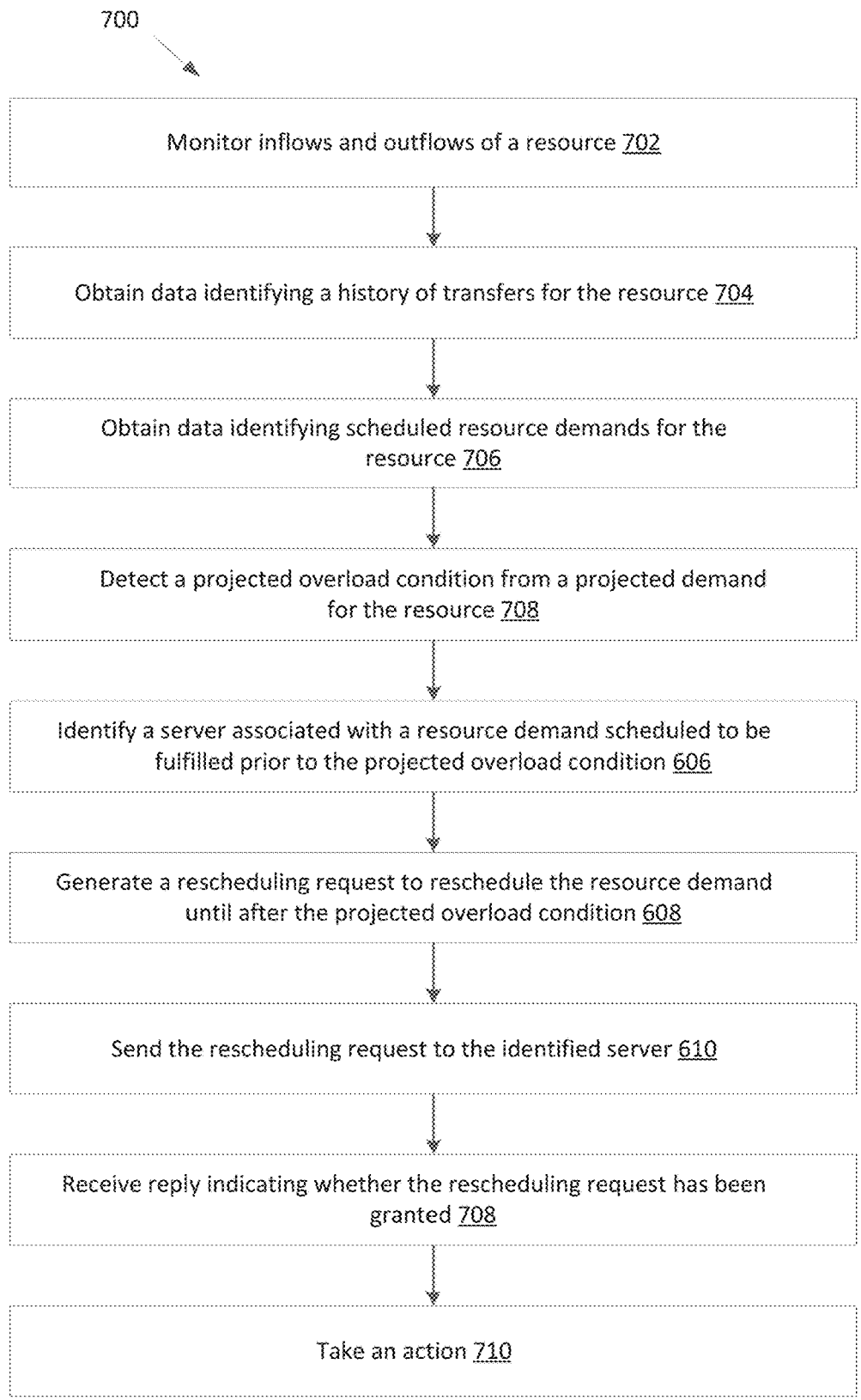
FIG. 7 is another flowchart showing operations performed in managing access to a resource based on a resource demand, according to an example embodiment.

It will be appreciated that the method 600 of FIG. 6 as described may be modified. In particular, the method 600 may be extended such that the detection of the projected overload condition may be based, at least in part, on a history of transfers for the resource. Reference will now be made to FIG. 7 which illustrates another example method 700 for managing access to a resource in a computing environment. It will be understood that the method 700 of FIG. 7 may be a modification of the method 600 of FIG. 6.

The operations of the example method 700 may be performed by a computer system which may be of the type described herein. In some embodiments, the operations of the method 700 may be performed by a first computing system 106, which may be of the type described herein.

In operation 702, the first computing system monitors inflows and outflows of a resource. The monitoring operation may involve monitoring transfers resulting from a plurality of transfer messages than may cause changes in the amount of the resource. In some embodiments, the system monitors the flow of resources into and out of an account. Records of the monitored transfers may be stored in a data store.

In operation 704, the first computing system may obtain data identifying a history of transfers for the resource. The data may, for example, be obtained from the data store.

In operation 706, the first computing system may obtain data identifying scheduled resource demands for the resource.

In operation 708, the first computing system may detect a projected overload condition from a projected demand for the resource. The operation 708 may be a variation of the operation 604 in the method 600 of FIG. 6.

The projected demand for the resource may be based on the scheduled resource demands and/or the history of transfers for the resource. In particular, the first computing system may identify, within the history of transfers, the occurrence of recurring transfers for fixed amounts. The first computing system may use the identified recurring historical transfers in order to predict future transfers that have not yet been scheduled by the first computing system. The predicted future transfers may be in the form of predicted resource demands or predicted resource supplies. A resource supply may indicate, for example, an amount that is transferred to a resource in order to increase the amount of the resource. In some embodiments, a resource supply may, for example, represent a payroll amount that is credited to an account at a regularly scheduled pay cycle.

The first computing system may detect a projected overload condition by determining the projected amount of the resource available over time. The current amount of the resource may be used as a starting point to which the scheduled resource demands and the predicted resource demands and supplies may be applied in a chronological order. If a shortfall event for the resource occurs at a point in time, then the system has detected a projected overload condition.

Operations 606, 608 and 610 in the method 700 of FIG. 7 may be similar to the corresponding operations 606, 608 and 610 in the method 600 of FIG. 6.

In operation 708, the first computing system receives a reply indicating whether the rescheduling request has been granted. In response, in operation 710 the system takes an action. The action may correspond to one or more operations 612, 614, 616, 618 and 620 of the method 600 of FIG. 6.

It will be appreciated that it may be that some or all of the above-described operations of the various above-described example methods may be performed in orders other than those illustrated and/or may be performed concurrently without varying the overall operation of those methods.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

As noted, certain adaptations and modifications of the described embodiments can be made. Therefore, the above discussed embodiments are considered to be illustrative and not restrictive.

What is claimed is:

1. A computer system comprising:
    a communications module;
    a processor coupled to the communications module; and
    a memory coupled to the processor storing instructions that, when executed by the computer system, cause the computer system to:
        detect a projected overload condition from a projected demand for a resource;
        select a resource demand requesting a transfer, from the computer system to the server, that is to occur prior to the projected overload condition;
        identify a server associated with the selected resource demand requesting the transfer to the server;
        generate a transfer extension request requesting an extension until a selected date that is after the projected overload condition;
        send, via the communications module, the transfer extension request to the identified server requesting the extension until the selected date that is after the projected overload condition; and
        initiate the transfer from the computer system to the identified server by the selected date in response to receiving from the identified server a reply including an indication of a grant of the transfer extension request.

2. The system of claim 1, wherein detecting the projected overload condition includes detecting a projected shortfall event.

3. The system of claim 1, wherein the transfer is to occur prior to a projected shortfall event.

4. The system of claim 1, wherein the projected demand for the resource is based on a history of transfers.

5. The system of claim 1, wherein the transfer is sufficient to cover a projected shortfall event.

6. The system of claim 1, wherein identifying the server is based on identifying a resource demand that includes an overage.

7. The system of claim 1, wherein identifying the server is based on identifying a resource demand that is associated with a server that supports rescheduling of resource demands.

8. The system of claim 1, wherein identifying the server includes selecting a resource demand corresponding to an amount that is based on an amount of a projected shortfall event.

9. The system of claim 1, wherein identifying the server includes mapping an identifier associated with the selected resource demand requesting the transfer to the server.

10. The system of claim 1, wherein the instructions further cause the computer system to receive the resource demand requesting the transfer that is to occur prior to the projected overload condition, and wherein the instructions that cause the computer system to select the resource demand further include instructions that cause the computer system to select the received resource demand requesting the transfer that is to occur prior to the projected overload condition.

11. The system of claim 1, wherein the instructions further cause the computer system to receive from an upload interface displayed on a remote device an upload of the resource demand requesting the transfer that is to occur prior to the projected overload condition, and wherein the instructions that cause the computer system to select the resource demand further include instructions that cause the computer system to select the uploaded resource demand requesting the transfer that is to occur prior to the projected overload condition.

12. A method for managing access to resources in a computing environment, the method comprising:
    detecting, by a computer system, a projected overload condition from a projected demand for a resource;
    selecting, by the computer system, a resource demand requesting a transfer, from the computer system to the server, that is to occur prior to the projected overload condition;
    identifying a server associated with the selected resource demand requesting the transfer to the server;
    generating a transfer extension request requesting an extension until a selected date that is after the projected overload condition;
    sending, via a communications module, the transfer extension request to the identified server requesting the extension until the selected date that is after the projected overload condition;
    initiating the transfer from the computer system to the identified server by the selected date in response to receiving from the identified server and via the communications module a reply including an indication of a grant of the transfer extension request.

13. The method of claim 12, wherein detecting the projected overload condition includes detecting a projected shortfall event.

14. The method of claim 12, wherein the transfer is to occur prior to a projected shortfall event.

15. The method of claim 12, wherein the projected demand for the resource is based on a history of transfers.

16. The method of claim 12, wherein the transfer is sufficient to cover a projected shortfall event.

17. The method of claim 12, wherein identifying the server is based on identifying a resource demand that includes an overage.

18. The method of claim 12, wherein identifying the server is based on identifying a resource demand that is associated with a server that supports rescheduling of resource demands.

19. The method of claim 12, wherein identifying the server includes selecting a resource demand corresponding to an amount that is based on an amount of a projected shortfall event.

20. A non-transitory computer-readable storage medium comprising processor-executable instructions which, when executed, configure a processor to:

detect a projected overload condition from a projected demand for a resource;

select a resource demand requesting a transfer, from the computer system to the server, that is to occur prior to the projected overload condition;

identify a server associated with the selected resource demand requesting the transfer to the server;

generate a transfer extension request requesting an extension until a selected date that is after the projected overload condition;

send, via a communications module, the transfer extension request to the identified server requesting the extension until the selected date that is after the projected overload condition; and initiate the transfer from the computer system to the identified server by the selected date in response to receiving from the identified server and via the communications module a reply including an indication of a grant of the transfer extension request.

* * * * *